Dec. 25, 1951 L. G. TUBBS 2,579,629
TORSION METER SYSTEM
Filed Sept. 27, 1947 5 Sheets-Sheet 1

WITNESSES:
E. A. McCloskey
W. L. Young

INVENTOR
Lester G. Tubbs,
BY
Paul E. Friedemann
ATTORNEY

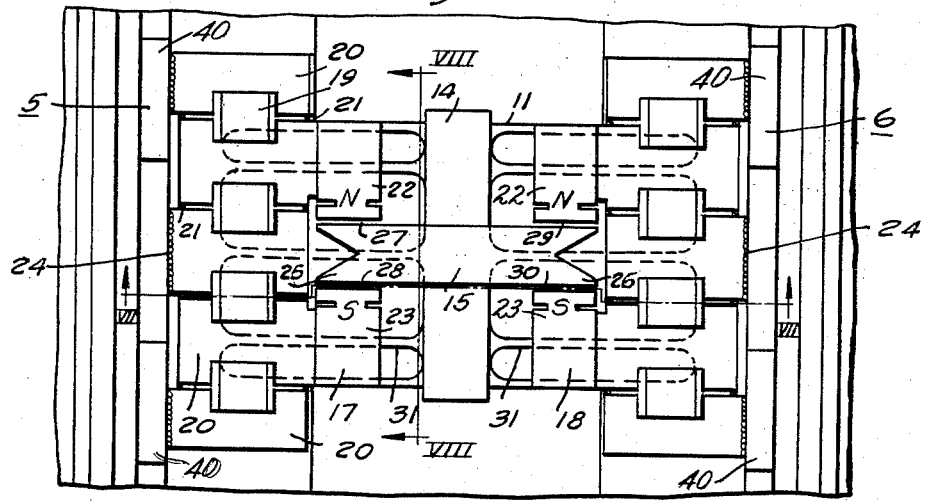
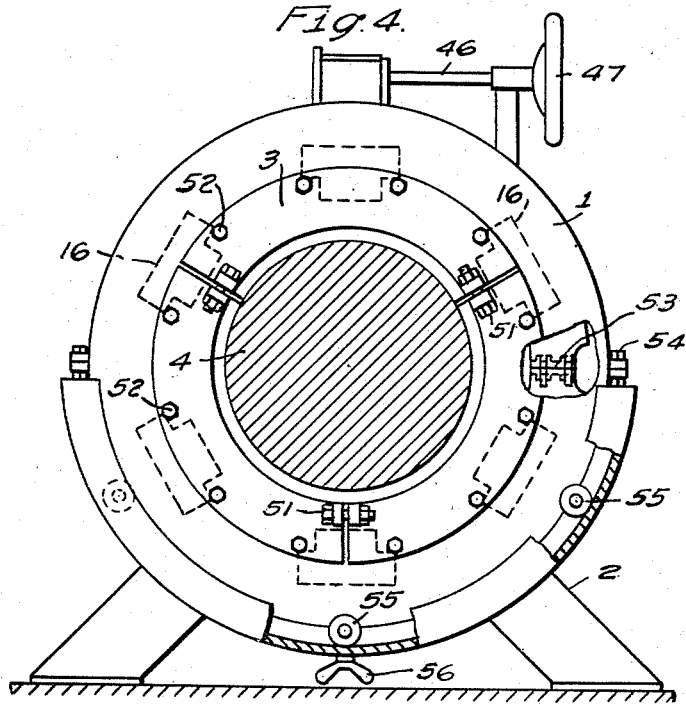

Dec. 25, 1951          L. G. TUBBS          2,579,629

TORSION METER SYSTEM

Filed Sept. 27, 1947          5 Sheets-Sheet 3

WITNESSES:

INVENTOR
Lester G. Tubbs.
BY
Paul E. Friedemann
ATTORNEY

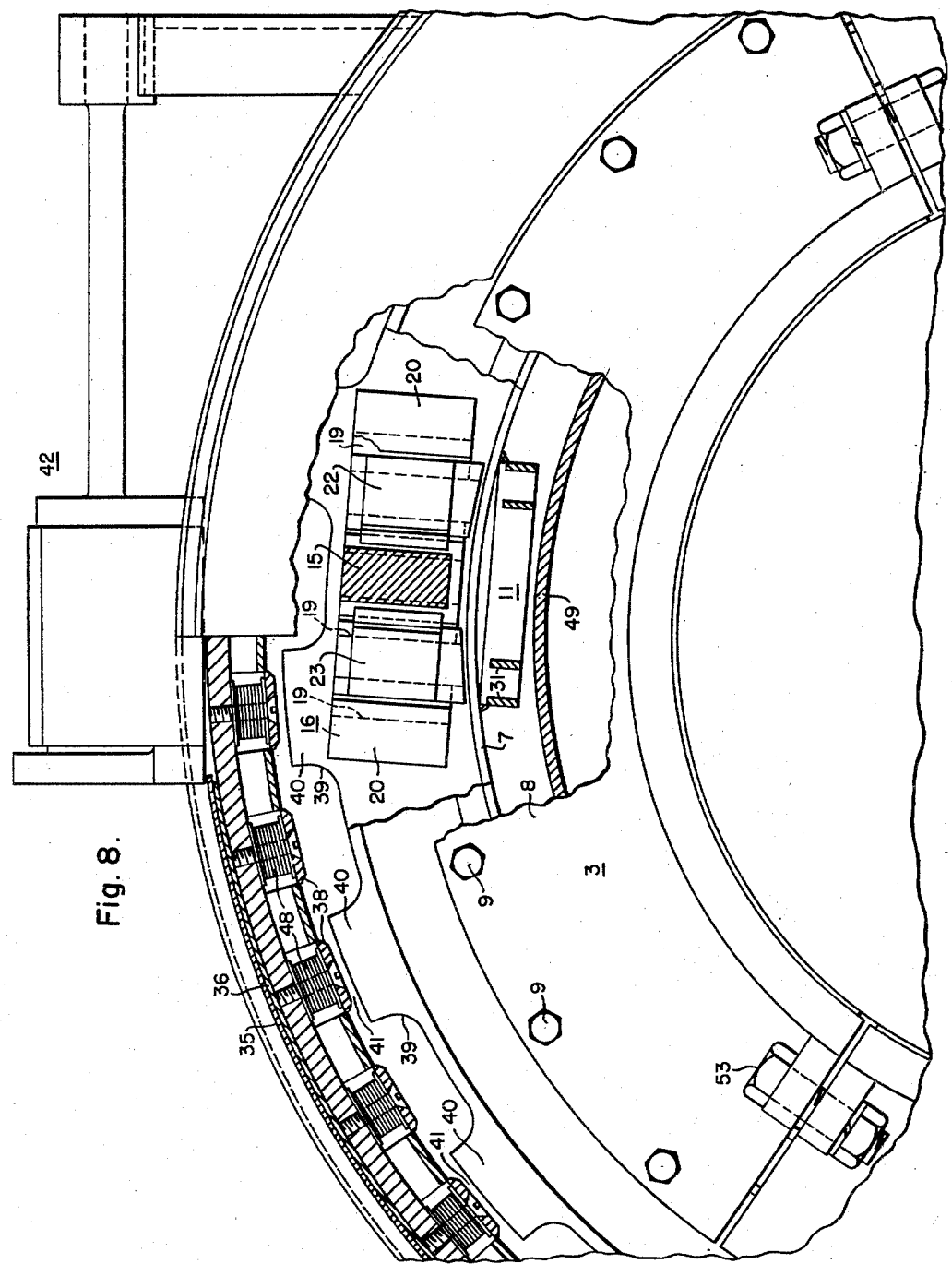

Patented Dec. 25, 1951

2,579,629

UNITED STATES PATENT OFFICE 2,579,629

TORSION METER SYSTEM

Lester G. Tubbs, Pittsburgh, Pa., assignor to Westinghouse Electric Corporation, East Pittsburgh, Pa., a corporation of Pennsylvania Application September 27, 1947, Serial No. 776,605

16 Claims. (Cl. 73—136)

This invention relates to apparatus for measuring the work being transmitted by a rotating shaft and, more particularly, to apparatus for continuously indicating the power being transmitted by a rotating shaft in convenient units, such as horsepower.

The apparatus of this invention is of the general type illustrated in the copending application of F. W. Godsey, Serial No. 455,258, filed August 18, 1942, presently involved in Interference No. 82,313, to which reference is hereby made for certain dominating features. A continuation-in-part of that application has become Patent No. 2,461,685.

In the above-mentioned copending application, there is shown a power measuring apparatus comprising a stator and a rotor secured to a rotating shaft, the rotor and stator being provided with a magnetized circuit from which flux is diverted in an amount proportional to the torque on the shaft through the pole pieces of a generator carried by the stator and rotor. The magnetic circuits interconnecting the rotor and stator include airgaps in a balanced relation which introduce reluctances into the magnetic circuit. By reason of the fact that the working magnetic circuit from which the flux is diverted through the generator pole pieces includes structure both on the rotor and stator, there will be considerable difference in the magnetic potential of the rotor and stator parts. There is thus considerable leakage flux in the space surrounding the rotor and stator structures. Because of this leakage flux, the reluctance characteristics of the magnetic circuits will be altered considerably by different or changing surrounding structures which vary the reluctance of the leakage path and thereby the reluctance of the magnetic circuit. This condition obviously will vary the calibration of the measuring unit and its accuracy will be to a certain extent dependent upon the characteristics of the structures surrounding the apparatus.

One of the principle objects of this invention is to provide a magnetic type of power measuring apparatus of the character referred to which will not be effected by the magnetic properties of surrounding structure. To this end, the invention contemplates the provision of an electric generator having a stator and a rotor in which the magnetic lines of force are confined to paths positioned between the rotor and stator. The rotor is provided with a balanced arrangement of magnetizing means from which flux is diverted through the stator in proportion to the torque on the power transmitting shaft. When no power is being trnasmitted, there will be no torque on the shaft and consequently, the stator structure will be deenergized and there will be no flux circulating through the stator structure. When torque is placed on the shaft, the magnetic potential of the stator structure, by reason of the flux circulating therethrough, will be balanced by structure on the rotor which will be at the same magnetic potential as that of the stator. The rotor and stator structures will thus be at the same average magnetic potential and will be neutral with respect to each other. Consequently, there will be no magnetic potential difference effective to cause flux leakage from the stator to the rotor on which surrounding structures would otherwise be effective to alter the reluctance characteristics of the apparatus.

A further object of the invention is to provide power measuring apparatus of the character referred to having a balanced arrangement of magnetic circuits in which the balance of such circuits is changed in accordance with the torque on a rotating shaft.

A still further object of the invention is to provide a novel arrangement of magnetic circuits of a type described in which the stator is maintained at a neutral magnetic potential with respect to an armature member mounted on the rotor.

Another object of the invention is to provide a novel arrangement of magnetic circuit interconnecting a rotor and stator in which the only flux circulating in such circuit is a flux proportional to the torque on a shaft on which the rotor is mounted and in which circuit the flux density is zero when there is no torque on the shaft.

A still further object of the invention is to provide an adjustable magnetic bias for a magnetic circuit interconnecting a rotor and stator structure for the purpose of neutralizing stray flux circulating therein when there is no torque on the shaft on which the rotor is mounted.

Other objects and advantages of the invention will become apparent from the following description.

In the drawings there is shown a preferred embodiment of the invention. In this showing:

Fig. 3 is a plan view of a portion of the rotor structure taken substantially along the line III—III of Fig. 1;

Fig. 4 is an end view showing the power measuring apparatus assembled on a shaft;

Fig. 8 is a vertical sectional view taken in planes perpendicular to the axis of the shaft and with parts broken away, but showing the magnetic energizing unit thereof substantially on the line VIII—VIII of Fig. 3.

Figure 1:
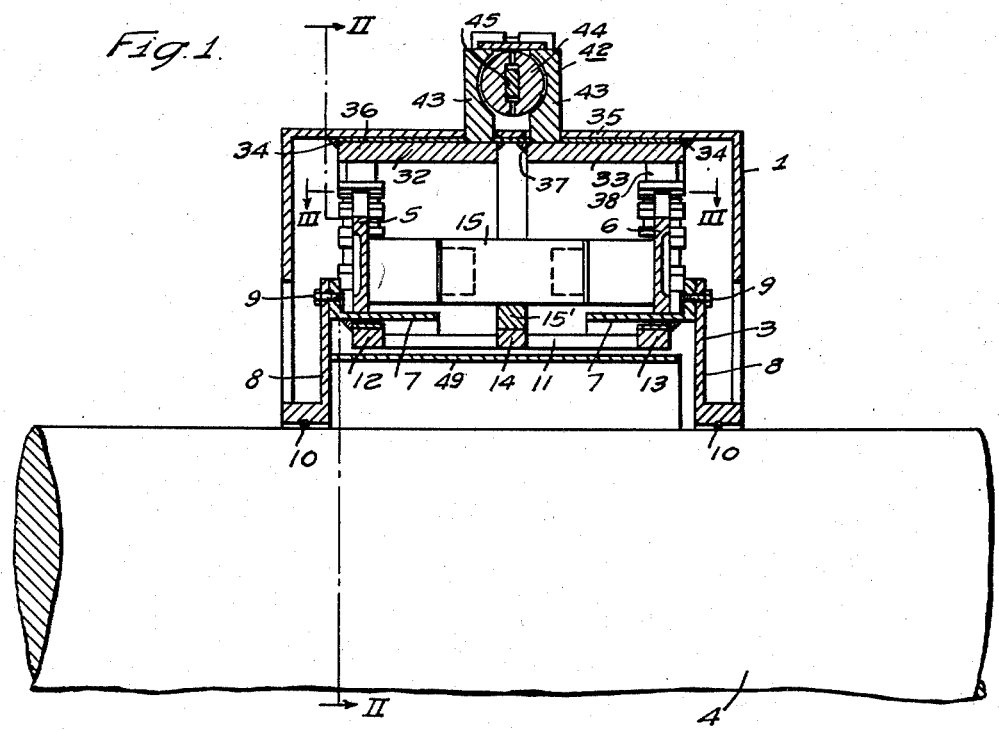
Figure 1 is a partial vertical sectional view of apparatus constructed in accordance with the principles of this invention showing the arrangement of such apparatus with respect to a power transmitting shaft.

The specific form of apparatus illustrated in the drawings is designed for use in measuring the horsepower transmitted by the drive shaft for a ship's propeller. Such shafts frequently range in size up to about 20" in diameter and the apparatus illustrated is capable of being used for shafts of different diameters by changing the clamping rings employed to mount the rotor on the shaft in a manner to be described.

As best shown in Fig. 4, thee horsepower measuring apparatus comprises a stator structure 1 which is mounted on a stationary support or cradle 2 and a rotor structure 3 which is clamped or secured to the shaft 4 for rotation therewith relative to the stationary stator 1. The construction of the stator 1 and rotor 3 will be best understood by referring to Figs. 1 and 2.

The rotor 3 comprises a pair of inductor rings 5 and 6, mounted respectively on annular supporting members 7 secured to clamping rings 8 by a plurality of bolts 9. The clamping rings 8 are preferably constructed of non-magnetic material and are spaced slightly from the shaft 4 by means of circular rods 10 in order that the material of the shaft 4 will not be included in the magnetic circuit of the inductor rings 5 and 6. The inductor rings 5 and 6 are rigidly spaced from each other by spring assemblies 11, each of which comprises end pieces 12 and 13, a center piece 14 centrally therebetween and a plurality of spaced resilient ribs 31 which connect the end pieces 12 and 13 through the medium of the center piece 14. The narrow edges of each of the end pieces 12 and 13 are welded by non-magnetic material to the under surfaces of the associated supporting member 7.

The rotor 3 also comprises a plurality of magnetic energizing units, each of which is indicated as a whole by the numeral 16. Each unit 16 comprises a magnetic circuit which is symbolically represented in the lower part of Fig. 6 and is constructed as shown more specifically in Figs. 1, 2, 3, 7 and 8. Each unit 16 comprises an armature 15 between a pair of C-shaped magnetic structures 17 and 18. The armature 15 is carried by and radially spaced outwardly from the central member 14 of the spring structure 11 through an intermediate base member 15', the armature being arranged perpendicularly with respect to the central member 14. In a sense the central member 14 constitutes a support for supporting the armature 15 by the resilient ribs 31. The C-shaped magnet structures 17 and 18 are respectively secured to the inductor rings 5 and 6 and having similar pole pieces straddling the ends of the armature member 15.

Each of the C-shaped magnets 17 and 18 are permanently magnetized by a plurality of permanent magnets 19 arranged with their pole pieces as indicated. In constructing the magnets 17 and 18, the permanent magnets 19 are clamped between blocks of magnetizable material 20 which are then welded together along the vertical edges, as at 21, by non-magnetic material. Non-magnetic material is preferred for the welds 21 in order that substantially all of the flux in the leakage or by-pass paths will travel through the air and thus preserve the linear characteristics of the magnets. The contraction of the welding material 21 upon cooling thereof, will operate to hold the blocks 20 in tight engagement with the pole faces of the permanent magnets 19. After the blocks 20 are welded together, as described above, the pole pieces 22 and 23 are welded to the blocks 20, as shown in Fig. 3. With the arrangement of the magnets as illustrated, the pole piece 23 provides a south pole and a pole piece 22 provides a north pole. The C-shaped magnets 17 and 18 are welded to the inductor rings 5 and 6 by magnetic material, as at 24. The armature 15 has its ends 25 and 26 positioned between the pole pieces 22 and 23 of the C-shaped magnets 17 and 18 in such manner that an airgap is provided adjacent the pole faces of such pole pieces, as at 27, 28, 29 and 30. When the gaps 27 through 30 are equal, no flux will flow between the magnets 17 and 18. In such case, the flux will flow directly from the north poles 22 through the ends of the armature 15 to the south poles 23. The leakage path for each of the C-shaped magnets 17 and 18 will be directly from the end blocks 20 through the inductor ring 5 or 6 to which such blocks are magnetically connected. From the foregoing, it will be seen that when the gaps 27 through 30 are equal, there will be a balanced relation between the magnets 17 and 18 which will place the inductor rings 5 and 6 at the same magnetic potential, and the lines of force leaving and entering the pole faces of the magnets 17 and 18 will be confined to the associated ends of the armature 15.

The support for the armature 15 provided by the spring structure 11 is effective to prevent movement of the supporting members 7 and inductor rings 5 and 6 carried thereby in an axial direction with respect to the shaft 4 when the shaft is unstressed. However, the flexible members 31 of the spring structure 11 will flex to permit relative circumferential movement between the supporting members 7 in response to torque on the shaft 4 so as to shift the positions of the C-shaped magnets 17 and 18 with respect to the armature 15 in a manner and for a purpose to be described. This shift is only one or two thousandths of an inch, more or less, and there is usually enough give or flexibility in the support members 7 and clamping rings 8 to allow such shift.

Figure 2:
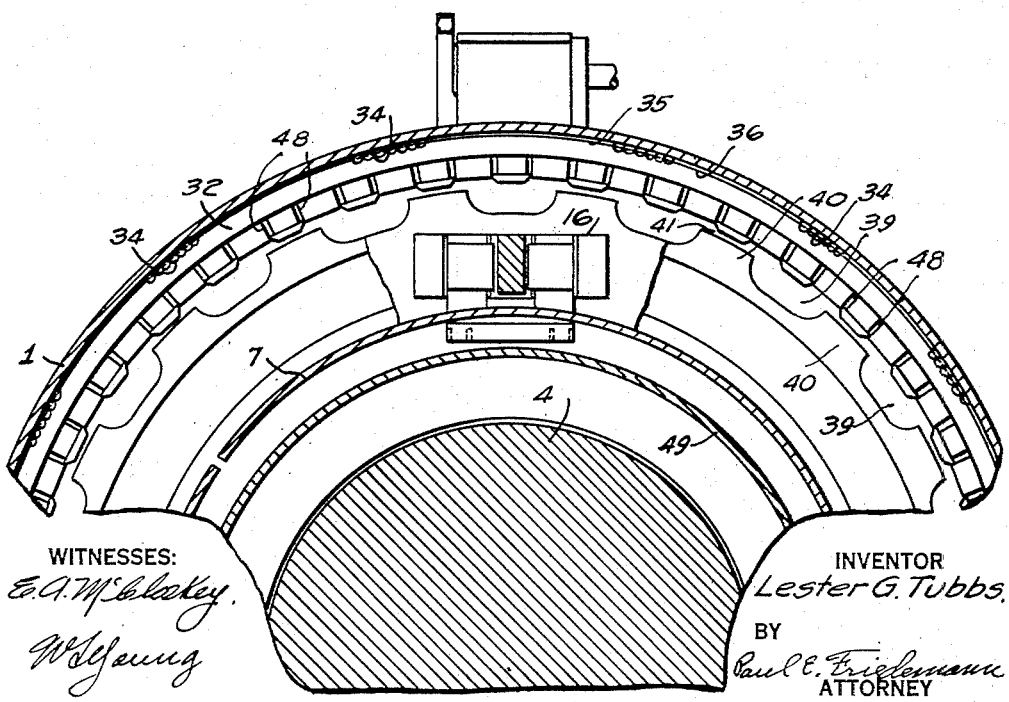
Fig. 2 is a sectional view taken substantially along the line II—II of Fig. 1.

Figs. 1, 2 and 3 show, in detail, the construction of only one of the magnetizing units 16. The rotor 3 is provided with a plurality of the units 16 and the arrangement of such units is shown in Fig. 4 wherein the dotted lines indicate generally the contour of each of such units.

The stator 1 comprises a pair of annular iron members 32 and 33 welded along the outer edges, as at 34, by non-magnetic material to an iron casing 35. An annular sheet of non-magnetic material 36, such as copper, is positioned between the casing 35 and the annular structures 32 and 33. The annular iron pieces 32 and 33 have their inner edges welded, as at 37, to the inner surface of the non-magnetic strip 36. The structure is such that the annular iron members 32 and 33 will be magnetically separate from each other and have a magnetic connection with the casing 35 through the low reluctance gap provided by the material 36. Each of the annular members 32 and 33 have a plurality of pole pieces 38 extending inwardly toward the inductor rings 5 and 6, respectively. The inductor rings 5 and 6 are provided with notches 39 providing pole pieces 40 distributed about the outer surface thereof, an airgap 41 being provided between the pole pieces 40 and the pole pieces 38. The reluctance of the gap between the casing 35 and the annular iron structures 32 and 33 is low as compared to that of the gap between the rotating inductor and the stator poles.

The stator completes a magnetic circuit for the inductor rings 5 and 6 whenever the inductor rings 5 and 6 are different magnetic potentials due to an unbalanced condition in the magnetizing units 16. Such magnetic circuit extends from the inductor ring 6 across some of the gaps 41, through some of the pole pieces 38, through the annular iron member 33, and across the gap provided by the material 36 to the casing 35, and returns from the casing 35 across the gap provided by the material 36 to the annular iron member 32, through some of the pole pieces 38, and then some of the gaps 41 to the other inductor ring 5.

Since it is difficult to obtain the balanced condition between the magnets 17 and 18, there is a possibility that stray flux may circulate through the stator 1 when there is no torque on the shaft 4. To compensate for the flow of such flux, a magnetic biasing unit, indicated as a whole by the numeral 42, is provided. The biasing unit 42 comprises a pair of iron supporting members 43 which are in magnetic engagement with each of the annular iron members 32 and 33. The supporting members 43 rotatably support an iron cylinder 44 formed of two halves having a permanent magnet 45 clamped therebetween. The cylinder 44 is connected by a rod 46 to a handwheel 47 by which the position of the magnet 45 may be adjusted with respect to the supports 43. By adjusting the position of the magnet 45, a magnetic biasing force is applied to the annular iron members 32 and 33 which will compensate or neutralize any stray flux flowing in the stator 1 when there is no torque on the shaft 4. The flat longitudinal faces of the magnet 45 are polarized so that when the magnet is in the position shown in Fig. 1 a maximum magnetic bias in one direction will be applied to the stator 1. When the magnet 45 is rotated through 180°, the bias provided by the magnet 45 will be a maximum in the opposite direction. Upon rotation of the magnet 45 through 90° to a position at right angles to the one illustrated, the magnet 45 will apply no bias to the stator 1. The magnetizing unit 42 provides a magnetic circuit which is connected in parallel with the main magnetic circuit provided by the stator 1 for the inductor rings 5 and 6.

Figure 5:
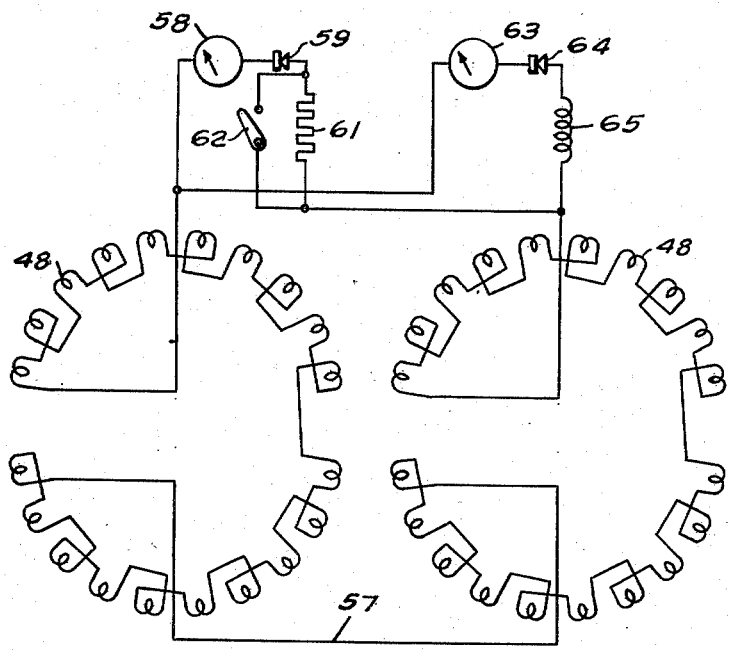
Fig. 5 is a diagrammatic view showing a circuit for obtaining the desired indication.

Each of the pole pieces 38 are provided with coils 48 which are connected in series, as shown in Fig. 5 for a purpose to be described.

An annular iron magnetic shield 49 is secured to one of the clamping rings 8 between the inductor rings 5 and 6 and the shaft 4 for preventing leakage of the inductor rings 5 and 6 through the material of the shaft 4. Leakage flux which might otherwise pass through the shaft 4 will thus enter the shield 49 and be diverted from one of the inductor rings to the other. In this manner, the shaft 4 is ineffective to alter the reluctance of the magnetic circuit and the same apparatus may be used with different size shafts without disturbing the calibration of the apparatus.

The description has thus far proceeded as though the stator 1 and rotor 3 were continuous structures surrounding the shaft 4. However, the rotor and stator are formed of separate pieces in order to facilitate assembly of the apparatus on a power transmitting shaft and in order that the apparatus may be applied to shafts of different sizes. The preferred construction will be best understood by considering the manner in which the apparatus is applied to a shaft.

The clamping rings 8 are formed of three sections which are assembled in position on the shaft 4 and bolted together by the bolts 51, as shown in Fig. 4. The annular supporting members 7 and the rings 5 and 6 are formed of two sections. With the clamping rings 8 in position, one of the rotor halves is first secured to each of the clamping rings 8 by bolts 52. Such half is then rotated to the bottom of the shaft 4 and the other rotor half is placed in position and secured to the clamping rings 8 by bolts 52. With the two rotor halves thus secured to the clamping rings 8, the rotor halves are then bolted together, as indicated at 53 in Fig. 4. With the rotor halves tightly bolted together, the bolts 51 are then tightened and thereafter the bolts 52 are tightened to connect all the parts of the rotor into one rigid unit. With the rotor in position on the shaft 4, the supporting cradle 2 carrying one half of the stator is positioned with respect to the rotor, as shown in Fig. 4. The top half of the stator is then placed over the lower half and the two halves are then clamped together by the bolts 54. The supporting cradle 2 is provided with rollers 55 on which the stator may be rocked back and forth through a limited angle with respect to the shaft 4 for a purpose to be described. A clamp 56 is provided for holding the stator from movement on the rollers 55 when the apparatus is in operation.

Each set of coils 48 carried by the pole pieces 38 on the annular iron members 32 and 33 is connected in series with each other, as shown in Fig. 5. One terminal end of each set of coils 48 is connected together by a lead 57. The other terminal ends of each set of coils 48 are connected in series with a meter 58, a rectifier valve 59 and a resistor 61. Switch 62 is provided for shunting the resistor 61 out of the circuit of the meter 58. The meter 58 will give an indication of the horsepower being transmitted by the shaft 4 in a manner to be described. A second meter 63 connected in series with the rectifier valve 64 and a coil 65 is connected across the terminal ends of the coils 48 for the purpose of indicating the torque on the shaft 4.

With the rotor 3 and stator 1 mounted on the shaft 4, in the manner described above, the apparatus is ready for operation. The apparatus is first calibrated by loosening the clamp 56 to permit rocking of the stator 1 when the shaft 4 is at rest. The switch 62 is then closed to short out the resistance 61 so that the induction of a small voltage in the coils 48 will be effective to produce an indication on the meter 58. When each of the armatures 15 is balanced with respect to the magnets 17 and 18, there will be no flux circulating in the stator 1 and rocking the stator back and forth will produce no deflection of the meter 63. However, it will be understood that such a balance is not easily obtainable and that there may be a small amount of flux circulating through the stator 1. This flux will be effective to cause a voltage to be generated in the coils 48 when the stator 1 is rocked back and forth causing the coils 48 to cut the lines of force passing through the pole pieces 38. In order to get a zero reading on the meter 58 with no torque on the shaft 4, the handwheel 47 is operated to adjust the position of the magnet 45 and thereby the magnetic bias on the stator 1. The position of the magnet 45 is changed until a position is reached in which the bias applied by such magnet to the stator will be effective to neutralize the flux circulating through the stator 1. When the magnet 45 is in the proper position, rocking movement of the stator 1 will be ineffective to produce an indication on the meter 58. The switch 62 may then be opened to insert the resistance 61 in series with the coils 48 and the apparatus will then be in condition for continuously indicating the power transmitted by the shaft 4.

Where the apparatus is installed on propeller shafts connected directly to the propeller of a naval vessel, the zero calibration is preferably made at the time just before the ship comes to rest and when the motion of the ship is insufficient to turn over the propeller. At this time, there will be a vibrating action on the propeller. When this vibratory action takes place, the actual torque on the shaft 4 will more closely approximate the zero torque on the propeller shaft than will be had when the propeller shaft is at rest and the inductors 5 and 6 cannot induce voltage in the coils 48.

When the shaft is rotating, torque on the shaft will cause an angular deflection of the portion of the shaft intermediate the clamping rings 8. This angular deflection will be proportional to the torque on the shaft and will be transmitted to the clamping rings 8 causing the angular position of such rings to be shifted relative to each other. This angular movement of the rings 8 will cause the magnets 17 and 18 to shift in opposite directions with respect to the armatures 15 and thereby disturb the balanced relation between such magnets. Flux will then flow between the magnets 17 and 18 in a direction dependent upon the direction of torque on the shaft 4. This will place one of the inductor rings 5 or 6 at a higher magnetic potential than the other and flux will flow through the stator 1 in an amount proportional to the torque on the shaft 4. This flux will be cut by the coils 48 and a voltage will be induced in such coils having a value dependent upon both the amount of flux flowing through the stator 1 and the speed of rotation of the shaft 4. Due to the resistor 61, a current will flow through the meter 58 in a direction controlled by the rectifier 59 and such current will vary with the horsepower being transmitted by the shaft 4. The meter 58 may be calibrated directly in terms of horsepower and the necessary reading may be taken directly from such meter.

The voltage induced in the coils 48 is generated in a manner similar to that of any conventional generator and will have a frequency proportional to the speed. By placing the coil 65 in series with the meter 63, there is provided an impedance which varies directly with the frequency of the voltage applied to the coil 65. Accordingly, it will be seen that as the speed of the shaft increases thereby increasing the voltage induced in the coils 48, the impedance provided by the coil 65 will increase to thereby maintain the current flowing through the meter 63 constant, notwithstanding the increase in voltage. In this manner, the effect of changing speed on the shaft 4 is compensated for by the coil 65 and the meter 63 may be calibrated in terms of torque on the shaft 4 and the torque reading taken directly from the meter 63.

Figure 6:
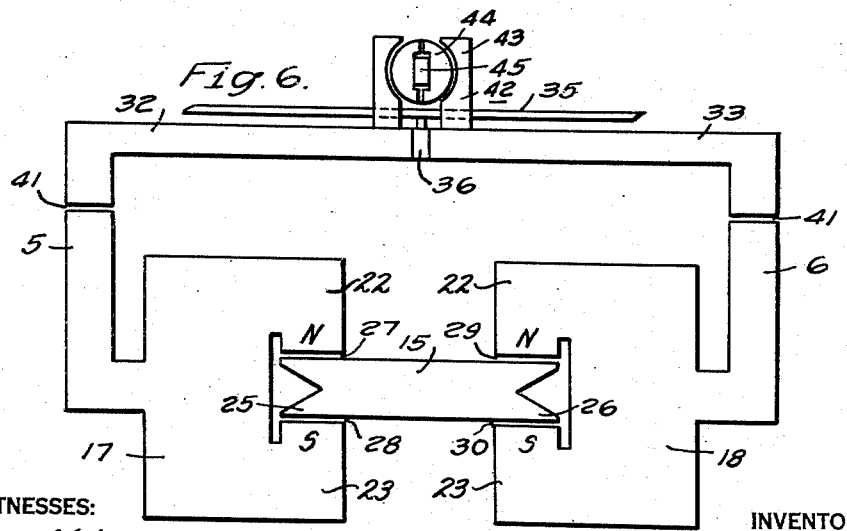
Fig. 6 is a diagrammatic view of a magnetic circuit corresponding to the magnetic circuits shown in Figs. 1 and 3.
Figure 7:
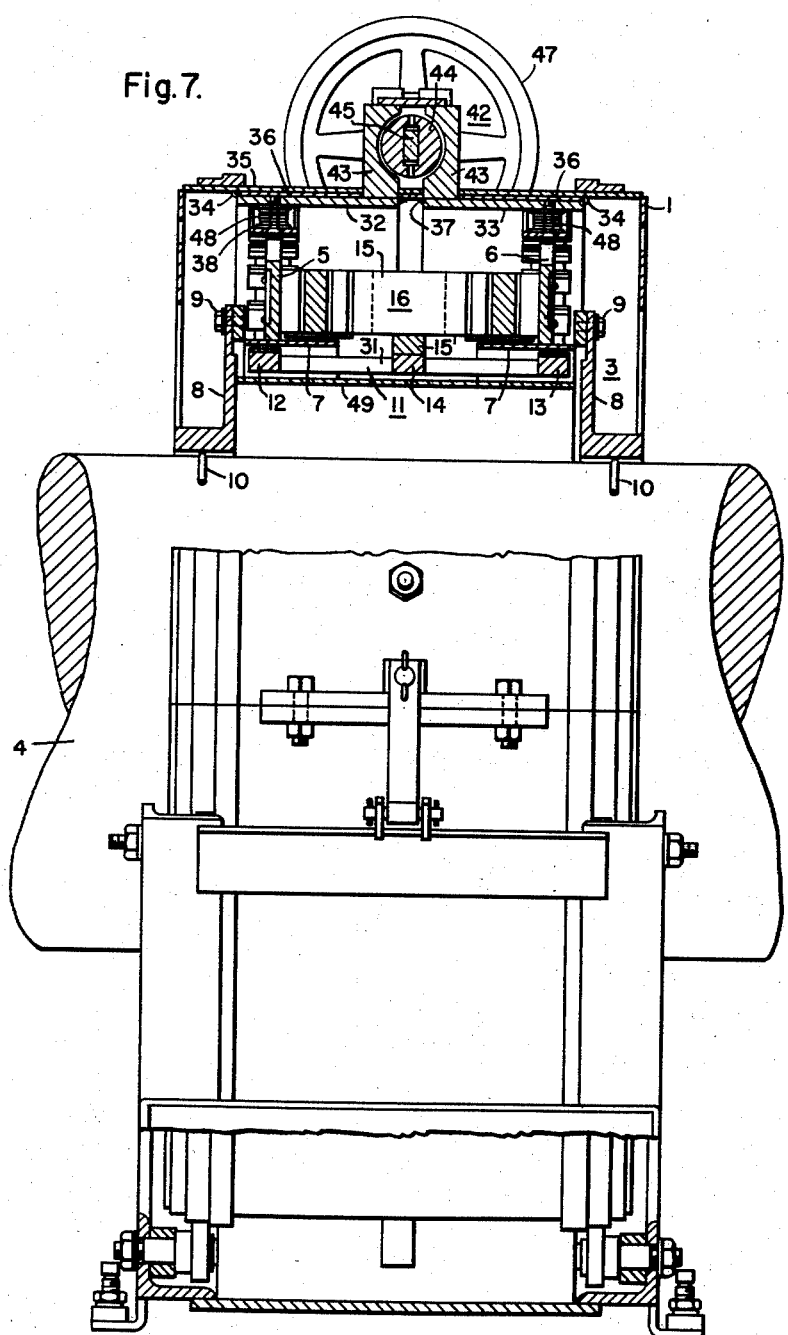
Fig. 7 is an enlarged view of Fig. 1 but showing the magnetic energizing unit thereof substantially on the line VII—VII of Fig. 3.

The essential characteristics of the magnetic circuits involved in the apparatus shown in Figs. 1 through 4 will be best understood by referring to Fig. 6. In this showing, the permanent magnets 17 and 18 have been illustrated diagrammatically together with an auxiliary circuit interconnecting such magnets. The auxiliary interconnecting circuit comprises the inductor rings 5 and 6 together with the airgaps 41 between the rings 5 and 6 and the stator parts 32 and 33. The stator parts 32 and 33 communicate with each other through a gap having a reluctance corresponding to that provided by the material 36 and the housing 34. By reason of the airgaps 41 being of the same size, the reluctance in both halves of the auxiliary circuit is the same and such circuit is provided with a balanced condition.

With the armature 15 in a balanced relation with respect to the magnets 17 and 18, the airgaps 27, 28, 29, and 30 are equal and provide like values of reluctance in the permanently magnetized circuits 17 and 18. Under such conditions, flux will not flow between the magnets 17 and 18 through the armature 15 and, therefore, there will be no flux diverted through the auxiliary circuit by way of the inductor rings 5 and 6. It will thus be seen that the auxiliary circuit interconnecting the magnetized circuits 17 and 18 is completely deenergized or has a flux density of zero when there is no torque on the shaft 4.

Assuming a torque on the shaft 4 in a clockwise direction from the left to right, the airgap 27 adjacent the north pole of the magnet 17 will decrease, as will the gap 30 adjacent the south pole of the magnet 18. This decreases the reluctance of the path from the north pole of the magnet 17 to the south pole of the magnet 18 and flux will then flow from the magnet 17 to the magnet 18. This flow of flux will place the member 6 at a higher magnetic potential than the magnetic potential of the member 5 and flux will then flow from the member 6 across the airgap 41, through member 33, across the gaps provided by the material 36 to the member 32, and then across the airgap 41 into the member 5 from which it returns to the north pole of the magnet 17. It will thus be seen that the only flux which will flow in the auxiliary circuit which includes the inductor rings 5 and 6 and airgaps 41, is a flux which is proportional to the torque on the shaft 4. Attention is particularly invited to the fact that the flux density in the auxiliary interconnecting circuit is zero when the torque on the shaft 4 is zero. It will thus be seen that the auxiliary interconnecting circuit which includes the stator 1 and inductor rings 5 and 6 does not have to deal with any magnetic forces other than that which is diverted from the magnets 17 and 18, and that all the remaining magnetic force is confined to that portion of the magnetic structure between the inductor rings 5 and 6.

Attention is also invited to the fact that the auxiliary circuit interconnecting the magnets 17 and 18 is a balanced circuit and a substantially closed magnetic circuit. It thus will be seen that leakage flux between the various parts of the circuit is kept at a minimum or actually eliminated.

This makes the apparatus substantially insensitive to surrounding structures, such as the metal hull of ships. Where there is considerable leakage flux, metallic objects appearing in the leakage path will vary the reluctance of the magnetic circuits and thereby disturb the calibration of such circuits. By keeping the leakage flux at a minimum or making such flux practically non-existent or providing a definite and permanent path therefor, such interference from outside objects is avoided and it is possible to mount the apparatus in close proximity to metallic objects without affecting its operation. The stator shell 36, being at the midpoint of the out-going and in-going parts of the flux path, is at a neutral magnetic potential with respect to the complete magnetic circuit. The shaft and other adjacent ship parts are likewise at a neutral magnetic potential with respect to the balanced leakage flux conditions. The stator shell is therefore at the same magnetic potential as the shaft and adjacent structures so there is no leakage flux between.

By positioning the material 36 directly in series with the magnetic circuit through the stator 1, an additional advantage is obtained with respect to leakage flux. This is essentially the same as placing the material 36 in a gap between the members 32 and 33, as indicated in Fig. 6, with the casing 35 in contact with the material of such gap. Since the reluctances in each half of the magnetic circuit on opposite sides of the gap are equal, there is provided a balanced arrangement and the potential of the material 36 and casing 35 will be at the same magnetic value as the average potential of the armature 15 when flux is flowing through the armature 15 between the magnets 17 and 18. By placing the casing 35 at a magnetic potential equal to that of the average magnetic potential of the armature 15, there will be no magnetic potential difference between these elements and thus no factors tending to set up a magnetic leakage path between such elements. It will thus be seen that the particular arrangement cooperates in keeping down leakage flux which would effect the calibration of the apparatus placed adjacent metallic objects.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. Apparatus for measuring the work being transmitted by a rotating shaft comprising a rotor structure, a stator structure, said rotor structure having parts, including magnetizing parts, providing a main magnetic circuit, said rotor and stator structures having parts cooperating to provide an auxiliary magnetic circuit connected with said main circuit, an armature on said rotor structure for controlling the diversion of flux from said main circuit into said auxiliary circuit, means responsive to the torque on said shaft for controlling the operation of said armature such that the flux diverted into said auxiliary circuit will provide a flux density therein directly proportional to torque, the flux density in said auxiliary circuits being zero when there is no torque on said shaft, and means responsive to the flux in said auxiliary magnetic circuit and to the speed of said shaft for indicating the work being transmitted by said shaft.

2. Apparatus for measuring the work being transmitted by a rotating shaft comprising a rotor structure, a stator structure, said rotor structure having parts, including magnetic parts, providing a pair of separate magnetic circuits respectively having a normally magnetized condition with flux circulating therein, said rotor and stator structures having parts cooperating to provide part of an auxiliary magnetic circuit interconnecting said pair of magnetic circuits, the remainder of said auxiliary magnetic circuit being provided by an armature extending between said pair of magnetic circuits, mounting means responsive to the torque on said shaft for adjusting the relative positions of said armature and separate magnetic circuits, said armature providing a balanced condition between said separate magnetic circuits for zero torque on said shaft such that the flux is confined to such circuits and providing an unbalanced condition operative to divert flux into said auxiliary circuit of a density proportional to the torque on said shaft when torque is applied to said shaft, and means responsive to the flux in said magnetic circuit and to the speed of said shaft for indicating the work being transmitted by said shaft.

3. Apparatus for measuring the work being transmitted by a rotating shaft comprising a rotor structure, a stator structure, said rotor structure having parts, including magnetic parts, providing a pair of separate magnetic circuits, an auxiliary magnetic circuit including a part of said stator, means responsive to torque on said shaft for diverting flux from said separate circuits into said auxiliary circuit, said means being inoperative to divert flux when there is no torque on said shaft, energization of said auxiliary circuit at other times being proportional to the torque on said shaft, and means responsive to the flux in said magnetic circuit and to the speed of said shaft for indicating the work being transmitted by said shaft.

4. In apparatus for measuring the work being transmitted by a rotating shaft, the combination comprising a pair of inductor rings secured to said shaft at points spaced from each other in a direction axially thereof, magnetizing means responsive to the torque on said shaft for controlling the magnetic potential of said rings, said magnetizing means being operative to maintain said rings at the same magnetic potential where there is no torque on said shaft and to vary the potential of said rings in opposite directions respectively with the application of torque to said shaft, and means comprising a member of relatively high permeability bridging said rings and cooperating therewith to provide a magnetic circuit between said rings in which the density of flux varies with the magnetic potential difference between said rings and thereby the torque on said shaft.

5. In apparatus for measuring the force applied to a member, the combination comprising a pair of inductors secured to said member at spaced points, magnetizing means responsive to the force applied to said member for controlling the magnetic potential of said inductors, said magnetizing means being operative to maintain said inductors at the same magnetic potential when there is no force on said member and to vary the potential of said inductors with the application of force to said member, and means comprising a member of relatively high permeability bridging said inductors and cooperating therewith to provide a magnetic circuit in which the flux density varies with the potential difference between said inductors and thereby the force applied to said member.

6. In apparatus for measuring the force applied to a member, the combination comprising a pair of inductors secured to said member at spaced points, magnetizing means responsive to the force applied to said member for controlling the magnetic potential of said inductors, said magnetizing means being operative to maintain said inductors at the same magnetic potential when there is no force on said member and to vary the potential of said inductor in opposite directions respectively with the application of force to said member, means comprising a member of relatively high permeability bridging said inductors and cooperating therewith to provide a magnetic circuit in which the flux density varies with the potential difference between said inductors and thereby the force applied to said member, and a magnet adjustably mounted on said bridging member for providing a magnetic bias therefor.

7. In apparatus for measuring the force applied to a member, the combination comprising a pair of inductors secured to said member at spaced points, magnetizing means responsive to the force applied to said member for controlling the magnetic potential of said inductors, said magnetizing means being operative to maintain said inductors at the same magnetic potential when there is no force on said member and to vary the potential of said inductors in opposite directions respectively with the application of force to said member, and means providing a magnetic circuit bridging said inductors comprising a pair of magnetic conductors respectively having parts extending into close proximity to a different one of said inductors so that an air gap is provided between each of said inductors and an associated conductor, a connecting member in engagement with each of said conductors, and an iron casing in engagement with said connecting member for completing the magnetic circuit between said conductors, said connecting member being constructed of a material having a reluctance higher than iron so as to provide a gap between said conductors and casing having a reluctance of a similar air gap.

8. In apparatus for measuring the force applied to a member, the combination comprising a pair of inductors secured to said member at spaced points, magnetizing means responsive to the force applied to said member for controlling the magnetic potential of said inductors, said magnetizing means being operative to maintain said inductors at the same magnet potential when there is no force on said member and to vary the potential of said inductors in opposite directions respectively with the application of force to said member, means providing a magnetic circuit bridging said inductors comprising a pair of magnetic conductors respectively having parts extending into close proximity to a different one of said inductors so that an air gap is provided between each of said inductors and an associated conductor, a connecting member in engagement with each of said conductors, and an iron casing in engagement with said connecting member for completing the magnetic circuit between said conductors, said connecting member being constructed of a material having a reluctance higher than iron so as to provide a gap between said conductors and casing having a reluctance of a similar air gap, and adjustable magnetizing means connected in shunt with said conductors to provide a variable magnetic bias for said magnetic bridging circuit.

9. In apparatus for measuring the force applied to a member, the combination comprising a pair of inductors secured to said member at spaced points, magnetizing means responsive to the force applied to said member for controlling the magnetic potential of said inductors, said magnetizing means comprising a pair of magnets respectively having flux conducting engagement with different ones of said inductors, an armature extending between said magnets, means mounting said armature for movement responsive to the force applied to said member, said armature having a position when there is no force on said member providing a balanced condition between said magnets such that said inductors are at the same magnetic potential and being movable in response to the application of force to said member to provide an unbalanced condition between said magnets effective to provide a magnetic potential difference between said inductors proportional to the force applied to said member, and a member of relatively high permeability bridging said inductors and cooperating therewith to provide a magnetic circuit in which the flux density varies with the potential difference between said inductors and thereby the force applied to said member.

10. In apparatus for measuring the force applied to a member, the combination comprising a pair of inductors secured to said member at spaced points, magnetizing means responsive to the force applied to said member for controlling the magnetic potential of said inductors, said magnetizing means comprising a pair of magnets respectively having flux conducting engagement with one of said inductors, an armature extending between said magnets, and means mounting said armature for movement responsive to the force applied to said member, said armature having a position when there is no force on said member providing a balanced condition between said magnets such that said inductors are at the same magnetic potential and being movable in response to the application of force to said member to provide an unbalanced condition between said magnets effective to provide a magnetic potential difference between said inductors proportional to the force applied to said member, means providing a magnetic circuit bridging said inductors comprising a pair of magnetic conductors respectively having parts extending into close proximity to a different one of said inductors so that an air gap is provided between each of said inductors and an associated conductor, a connecting member in engagement with each of said conductors, and an iron casing in engagement with said connecting member for completing the magnetic circuit between said conductors, said connecting member being constructed of a material having a reluctance higher than iron so as to provide a gap between said conductors and casing having a reluctance of a similar air gap.

11. In apparatus for measuring the force applied to a member, the combination comprising a pair of inductors secured to said member at spaced points, magnetizing means responsive to the force applied to said member for controlling the magnetic potential of said inductors, said magnetizing means comprising a pair of magnets respectively having flux conducting engagement with one of said inductors, an armature extending between said magnets, and means mounting said armature for movement responsive to the force applied to said member, said armature having a position when there is no force on said member providing a balanced condition between said magnets such that said inductors are at the same magnetic potential and being movable in response to the application of force to said member to provide an unbalanced condition between said magnets effective to provide a magnetic potential difference between said inductors proportional to the force applied to said member, means providing a magnetic circuit bridging said inductors comprising a pair of magnetic conductors respectively having parts extending into close proximity to a different one of said inductors so that an air gap is provided between each of said inductors and an associated conductor, a connecting member in engagement with each of said conductors, an iron casing in engagement with said connecting member for completing the magnetic circuit between said conductors, said connecting member being constructed of a material having a reluctance higher than iron so as to provide a gap between said conductors and casing having a reluctance of a similar air gap, and adjustable magnetizing means connected in shunt with said conductors to provide a variable magnetic bias for said magnetic bridging circuit.

12. In apparatus for measuring the force applied to a part by a measure of the distortion of the part, a distortion-responsive means comprising a spring structure having a pair of end pieces, connecting means extending to and between said end pieces and comprising resilient spring means, an armature member having a relatively high permeability carried by said connecting means, and a C-shaped magnetic structure associated with each of said end pieces, the openings in said magnetic structures receiving the ends of said armature member.

13. A distortion-responsive means as defined in claim 12 but further characterized by said C-shaped magnet structures comprising magnetizing means magnetizing said magnet structures so that each has a north magnetic pole on the same side of said armature member.

14. In apparatus for measuring the force applied to a part by a measure of the distortion of the part, a distortion-responsive means comprising a spring structure having a pair of end pieces, a central piece therebetween and resilient spring-members connecting said end pieces to said center piece, an armature member having a relatively high permeability carried by said center piece substantially parallel to said spring members, magnet means carried by each of said end pieces and associated with said armature member to provide separate air-gaps therewith, said magnet means comprising C-shaped magnets magnetizing said magnet structures so that each has a north magnetic pole on the same side of said armature, inductors associated with said end pieces, and members providing an auxiliary magnetic circuit having a portion extending between said inductors.

15. A distortion-responsive means as defined in claim 14 but further characterized by said inductors being rotatable with respect to the last said members, and coil-means associated with the last said members magnetically related to said inductors.

16. A distortion responsive means as defined in claim 15 but further characterized by a magnetism-biasing means in said auxiliary magnetic circuit.

LESTER G. TUBBS.

REFERENCES CITED

The following references are of record in the file of this patent:

UNITED STATES PATENTS

| Number | Name | Date |
|---|---|---|
| 2,445,427 | Godsey | July 20, 1948 |
| 2,461,685 | Godsey | Feb. 15, 1949 |

FOREIGN PATENTS

| Number | Country | Date |
|---|---|---|
| 215,986 | Great Britain | May 22, 1924 |